(12) United States Patent
Boland

(10) Patent No.: US 10,017,161 B2
(45) Date of Patent: Jul. 10, 2018

(54) WINDSCREEN WIPER DEVICE

(75) Inventor: Xavier Boland, Arlon (BE)

(73) Assignee: Federal-Mogul S.A., Arlon (BE)

( * ) Notice: Subject to any disclaimer, the term of this patent is extended or adjusted under 35 U.S.C. 154(b) by 431 days.

(21) Appl. No.: 14/410,826

(22) PCT Filed: Jun. 26, 2012

(86) PCT No.: PCT/EP2012/062286
§ 371 (c)(1),
(2), (4) Date: Feb. 19, 2015

(87) PCT Pub. No.: WO2014/000768
PCT Pub. Date: Jan. 3, 2014

(65) Prior Publication Data
US 2015/0197216 A1   Jul. 16, 2015

(51) Int. Cl.
*B60S 1/38* (2006.01)

(52) U.S. Cl.
CPC ........... *B60S 1/3858* (2013.01); *B60S 1/3868* (2013.01); *B60S 1/3879* (2013.01)

(58) Field of Classification Search
CPC .............................. B60S 1/3858; B60S 1/3879
USPC ....................................................... 15/250.32
See application file for complete search history.

(56) References Cited

U.S. PATENT DOCUMENTS 6,668,419 B1 * 12/2003 Kotlarski ................. B60S 1/38
15/250.32

FOREIGN PATENT DOCUMENTS

| DE | 10043426 A1 | 3/2002 | |
| DE | 10043427 A1 | 3/2002 | |
| DE | 10058208 B4 * | 6/2009 | ................ B60S 1/38 |
| DE | 102009045672 A1 | 4/2011 | |
| KR | 20070114455 A | 12/2007 | |
| WO | WO2010/016000 A1 | 2/2010 | |
| WO | WO2011/161619 A1 | 12/2011 | |

OTHER PUBLICATIONS

DE10043426A1 (machine translation), 2002.*
DE10058208B4 (machine translation), 2002.*

* cited by examiner

*Primary Examiner* — Andrew A Horton
(74) *Attorney, Agent, or Firm* — Robert L. Stearns; Dickinson Wright, PLLC

(57) ABSTRACT

A windscreen wiper device of the flat blade type, particularly for automobiles, includes an elastic, elongated carrier element, as well as an elongated wiper blade of a flexible material, which can be placed in abutment with a windscreen to be wiped. The wiper blade includes opposing longitudinal grooves on its longitudinal sides, in which grooves spaced-apart longitudinal strips of the carrier element are disposed. A connecting device for an oscillating arm is connected to at least one longitudinal strip by at least one pin cooperating with a hole provided in the longitudinal strip. The pin; is movable from a first position, wherein the pin in a pre-mounted position is fixed to the connecting device, into a second position, wherein the pin in a mounted position as a single constructional element is interconnecting the connecting device and the longitudinal strip.

7 Claims, 7 Drawing Sheets

WINDSCREEN WIPER DEVICE

BACKGROUND OF THE INVENTION

1. Technical Field

The present invention relates to a windscreen wiper device of the flat blade type, particularly for automobiles, comprising an elastic, elongated carrier element, as well as an elongated wiper blade of a flexible material, which can be placed in abutment with a windscreen to be wiped, which wiper blade includes opposing longitudinal grooves on its longitudinal sides, in which grooves spaced-apart longitudinal strips of the carrier element are disposed, which windscreen wiper device comprises a connecting device for an oscillating arm, wherein the oscillating arm can be pivotally connected to the connecting device about a pivot axis near one end thereof.

2. Related Art

Such a windscreen wiper device is generally known. This prior art windscreen wiper device is designed as a so-called "flat blade" or "yokeless blade", wherein no use is made of several yokes pivotally connected to each other, but wherein the wiper blade is biassed by the carrier element, as a result of which it exhibits a specific curvature. The spoiler is also called an "air deflector".

SUMMARY OF THE INVENTION

The object of the invention is to provide an improved windscreen wiper device.

In order to accomplish that objective, a windscreen wiper device of the type referred to in the introduction is characterized according to the invention in that the connecting device is connected to at least one longitudinal strip by at least one pin cooperating with a hole provided in the longitudinal strip, wherein the pin is movable from a first position, wherein the pin in a pre-mounted position is fixed to the connecting device, into a second position, wherein the pin in a mounted position as a single constructional element is interconnecting the connecting device and the longitudinal strip. Preferably, the pin is slidable from the first position into the second position. In the second position, the pin extends through the hole in the longitudinal strip, thus interconnecting the connecting device and the longitudinal strip.

In a preferred embodiment of a windscreen wiper device in accordance with the invention the pin can be pressed from the first position into the second position.

In another preferred embodiment of a windscreen wiper device according to the invention in the first position the pin and the connecting device are made in one piece. Preferably, this is done manually.

In another preferred embodiment of a windscreen wiper device in accordance with the invention the connecting device comprises a guiding channel for guiding the pin from the first position into the second position. Preferably, the guiding channel extends in a direction at least substantially perpendicular to the windscreen to be wiped.

In another preferred embodiment of a windscreen wiper device according to the invention the pin in a pre-mounted position is fixed to the connecting device near an end of the guiding channel facing towards a windscreen to be wiped.

In another preferred embodiment of a windscreen wiper device in accordance with the invention the connecting device has a substantially U-shaped cross-section, wherein free ends of legs of the U-shaped cross-section extend inwardly so as to form grooves for receiving longitudinal sides of the wiper blade, wherein the free ends are provided with the guiding channels for guiding the pin.

In another preferred embodiment of a windscreen wiper device according to the invention the connecting device is connected to the longitudinal strips by two pairs of opposite pins cooperating with correspondingly shaped holes in the longitudinal strips. Particularly, the connecting device is connected to the longitudinal strips by two pairs of opposite pins cooperating with correspondingly shaped holes in the longitudinal strips and interconnecting the connecting device and the longitudinal strips near the outer ends of the connecting device.

Preferably, the pins and the holes in the longitudinal strips are (slightly) misaligned, so as to ensure that a sidewall of each pin abuts against a wall of a corresponding hole, particularly at a location facing towards a corresponding leg of the U-shaped cross-section of the connecting device. Lateral play of the strips is thus avoided, as they are pressed against the legs.

The hole(s) preferably has/have a closed circumference. The hole(s) is/are preferably stamped in the longitudinal strip(s).

Preferably, the connecting device is pivotally connected the oscillating arm without the interposition of a joint part. In the alternative, a interposed joint part is used, wherein the joint part is detachably connected to the connecting device by engaging protrusions of the connecting device, at the location of the pivot axis, in recesses provided in the joint part. This is preferably realized through a snapping or clipping operation. Particularly, the joint part has an at least substantially U-shaped cross-section at the location of its connection to the connecting device, wherein the joint part is provided with a recess provided coaxially with the pivot axis. In particular, the protrusions extend outwards on either side of the connecting device and are preferably cylindrical in shape. In the alternative, the protrusions are spherical or frusto-conical in shape. The protrusions that function as bearing surfaces are thus paced far apart, so that forces exerted thereon will be relatively low. In yet another preferred variant the joint part is provided with co-axial through holes in legs of the U-shaped cross-section thereof, wherein a pivot pin is inserted in the through holes.

The above-mentioned protrusions are preferably provided with co-axial through holes. Accordingly, the wiper blade may then be connected to the oscillating arm on the basis of a so-called "sidelock system". The oscillating arm is provided with a joint pin or a pivot pin to be inserted in the co-axial through holes. The pivot pin protrudes in a direction towards the wiper blade and has a pivot axis extending in a direction of the oscillating movement of the oscillating arm. In the alternative, the joint part comprises at least one resilient tongue engaging in a correspondingly shaped hole provided in a base of a U-shaped cross-section of the oscillating arm, and wherein the resilient tongue is rotatable along a hinge axis between an outward position retaining the wiper blade onto the oscillating arm and an inward position releasing the wiper blade from the oscillating arm. Accordingly, the wiper blade may then be connected to the oscillating arm on the basis of a so-called "toplock system" on the basis of a bayonet connection. In order to connect the wiper blade onto the oscillating arm, the resilient tongue is initially pushed in against a spring force—as if it were a push button—and then allowed to spring back into the hole provided in the oscillating arm, thus snapping, that is clipping the resilient tongue into the hole. By subsequently pushing in again the resilient tongue against the spring force, the wiper blade may be released from the oscillating arm.

It is noted that in the invention use is made of a mounting head fixed for rotation to a shaft, wherein the shaft is rotatable alternately in a clockwise and in a counter-clockwise sense carrying the mounting head into rotation. Thus, in turn the mounting head draws the connecting device into rotation and thereby moves the wiper blade. In the alternative, the mounting head is fixed for translation to a carriage, wherein the carriage can be translated alternately in a one linear direction and in another counter linear direction carrying the mounting head into translation. The present invention can therefore be used for circular or linear movement of the mounting head.

THE DRAWINGS

The invention will now be explained more in detail with reference to figures illustrated in a drawing, wherein FIG. 1 is an exploded view of a preferred embodiment of a windscreen wiper device according to the invention;

DETAILED DESCRIPTION

Figure 1:
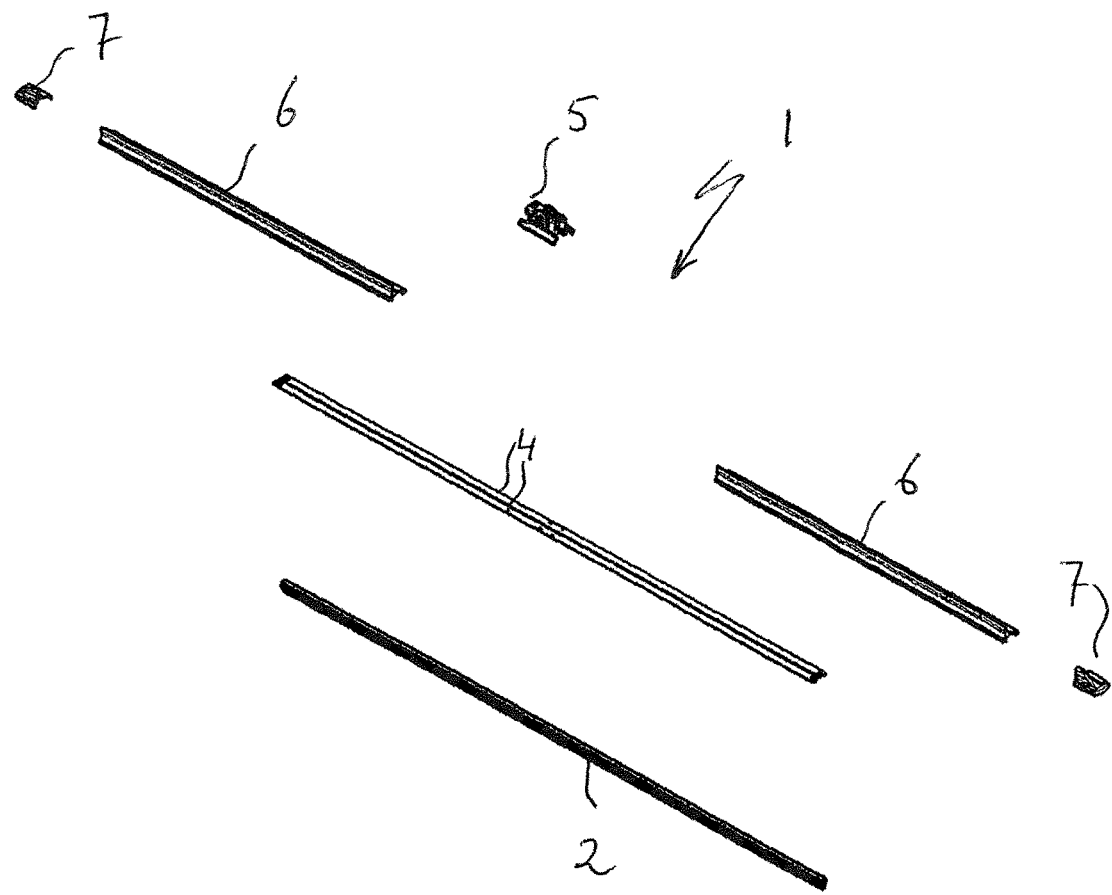

FIG. 1 shows an exploded view of a preferred variant of a windscreen wiper device 1 according to the invention. The windscreen wiper device 1 is built up of an elastomeric wiper blade 2 comprising opposing longitudinal grooves 3 on its longitudinal sides, wherein spaced-apart longitudinal strips 4 made of spring band steel are fitted in the longitudinal grooves 3 (see FIGS. 4 and 5). The strips 4 form a flexible carrier element for the rubber wiper blade 2, as it were, which is thus biassed in a curved position (the curvature in operative position being that of a windscreen to be wiped). The windscreen wiper device 1 is furthermore built up of a connecting device 5 of plastic or metal for connecting an oscillating wiper arm thereto (not shown), without the interposition of a joint part. The oscillating wiper arm is pivotally connected to the connecting device 5 about a pivot axis near one end. The preferred embodiment of FIG. 1 according to the invention comprises a two-piece spoiler or "air deflector" 6 which is detachably connected to the strips or flexors 4 and which extends along the entire length thereof. Connecting pieces or end caps are connected to the wiper blade 2 on both ends thereof.

Although not shown in FIG. 1, but fully understood by a skilled person, the oscillating arm is connected to a mounting head fixed for rotation to a shaft driven by a small motor. In use, the shaft rotates alternately in a clockwise and in a counter-clockwise sense carrying the mounting head into rotation also, which in turn draws the oscillating arm into rotation and by means of the connecting device 5 moves the wiper blade 2.

Figure 2:
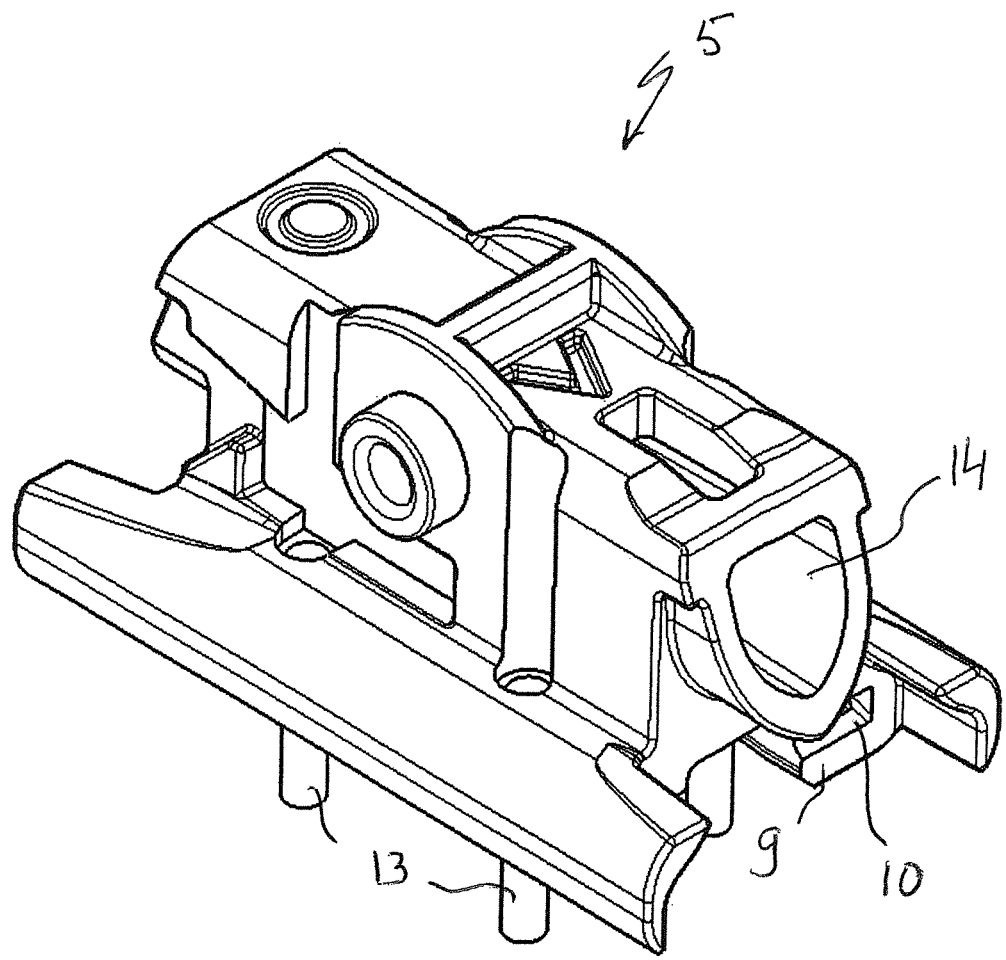
FIGS. 2 and 3 are several perspective, schematic views of a connecting device, as used in a windscreen wiper device of FIG. 1, further elucidating the working principle of the mutual fixation of the connecting device and the longitudinal strips.
Figure 3:
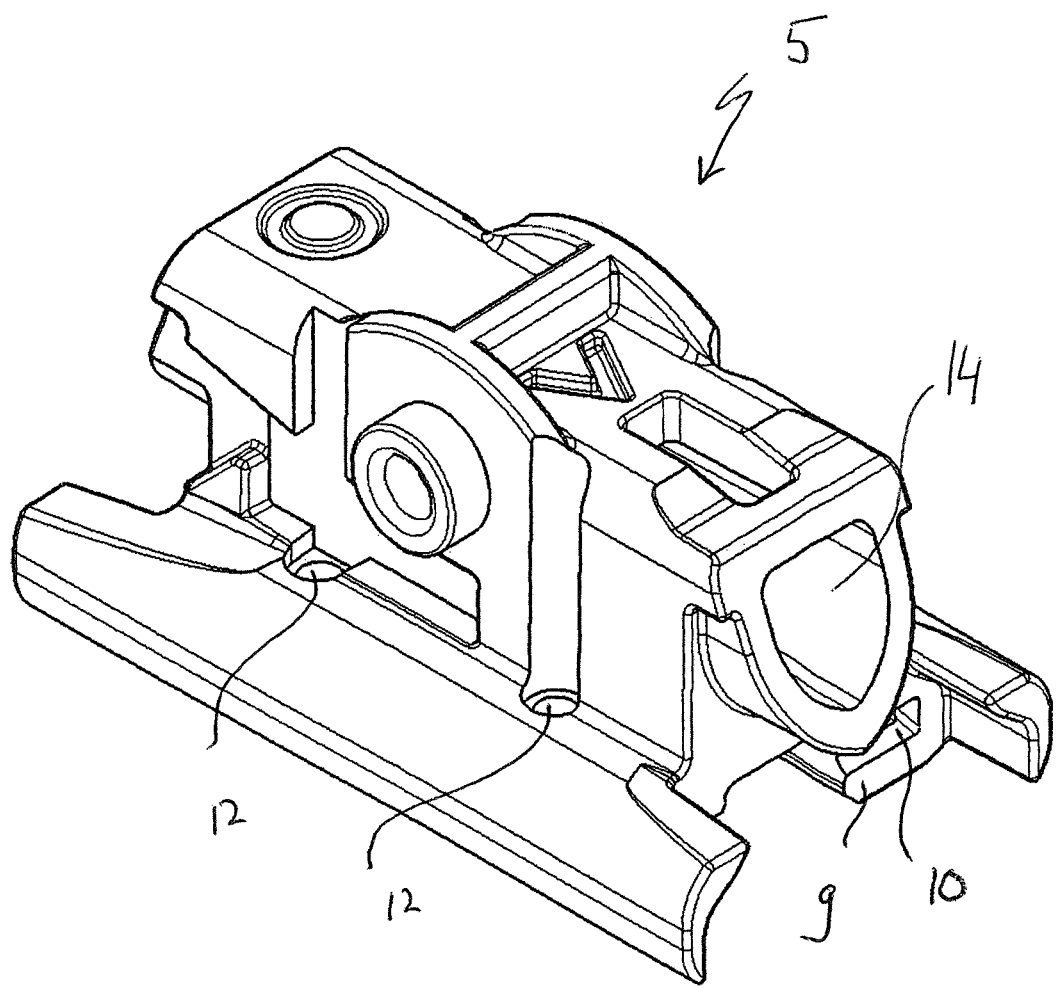

FIGS. 2 and 3 show in perspective several views of a connecting device 5 used in the windscreen wiper device 1 of FIG. 1. As mentioned earlier, this connecting device 5 has a more or less U-shaped cross-section with legs 8. Free ends 9 of the legs 8 of the U-shaped cross-section extend inwardly so as to form grooves or slits 10 for receiving the longitudinal strips 4. Walls 11 of the connecting device 5 parallel to the free ends 9 are provided with through holes 12 for receiving free ends of pins 13, as will be further explained hereunder. The connecting device 5 further comprises an interior space 14 functioning as a water channel extending in longitudinal direction of the connecting device 5. During use the water channel 14 transports rain water therethrough. In other words, in use rain water is carried away from a first side of the connecting device 5 facing away from the free end of the oscillating arm to a second side of the connecting device 5 facing towards the free end of the oscillating arm. As a result of the oscillatory movement of the oscillating arm, in practice an over pressure relative to the environment exists at the location of the first side of the connecting device 5, while an under pressure relative to the environment is present at the location of the second side of the connecting device 5. Due to the over pressure and the under pressure rain water is "automatically" pressed through the water channel.

Figure 6:
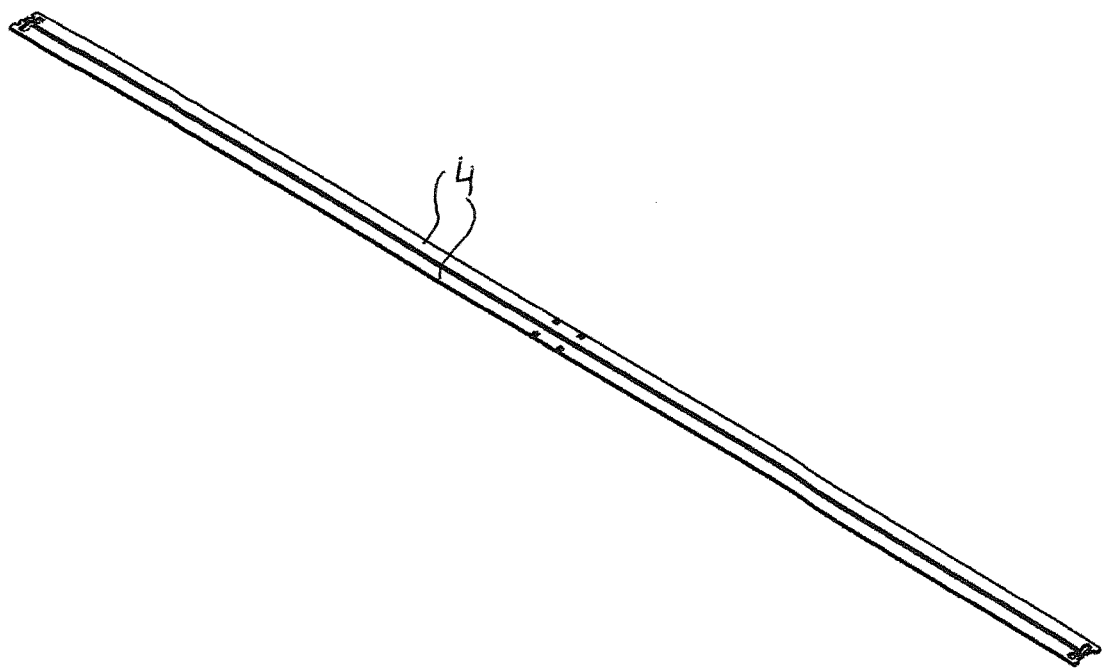
FIG. 6 is a schematic, perspective view of the longitudinal strips, as used in a windscreen wiper device of FIG. 1.
Figure 7:
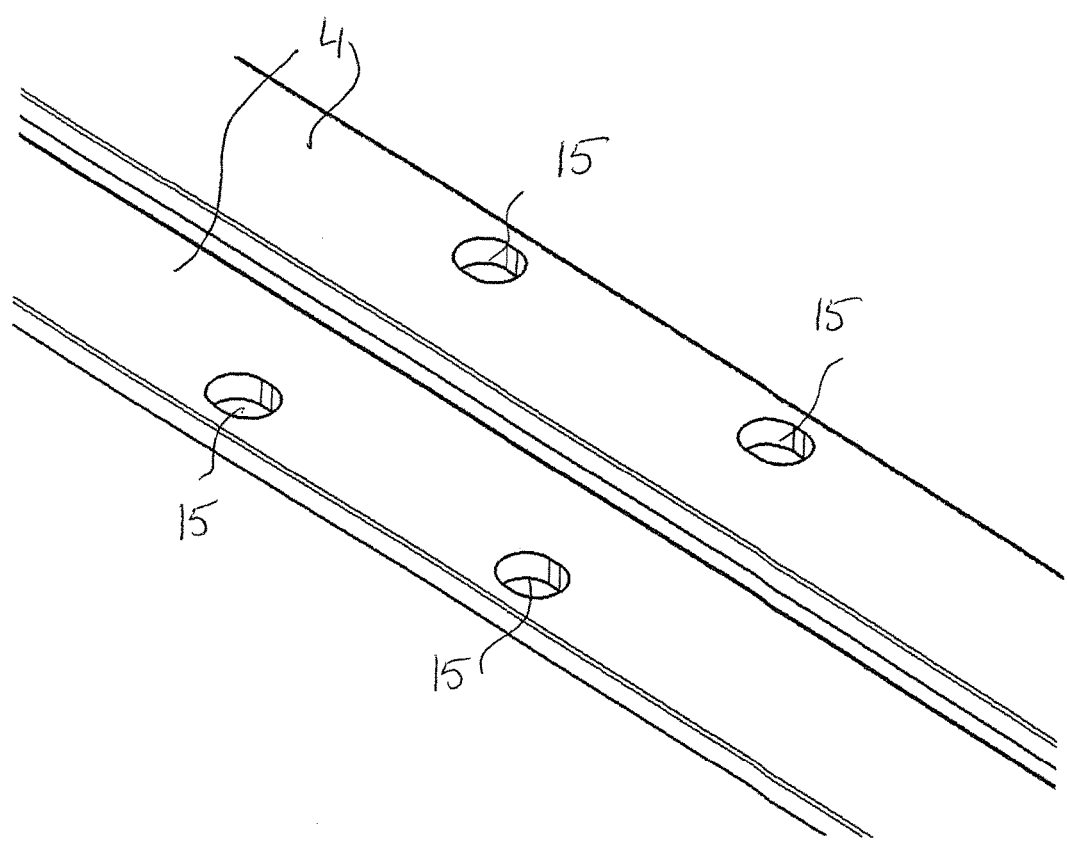
FIG. 7 shows a detail of the longitudinal strips shown in FIG. 6.

The longitudinal strips 4, as shown in FIGS. 6 and 7, are each provided with two through holes 15 cooperating with the corresponding pins 13. The holes 15 are made through a stamping operation in order to accurately control the shape of the holes 15 having a closed circumference.

Figure 4:
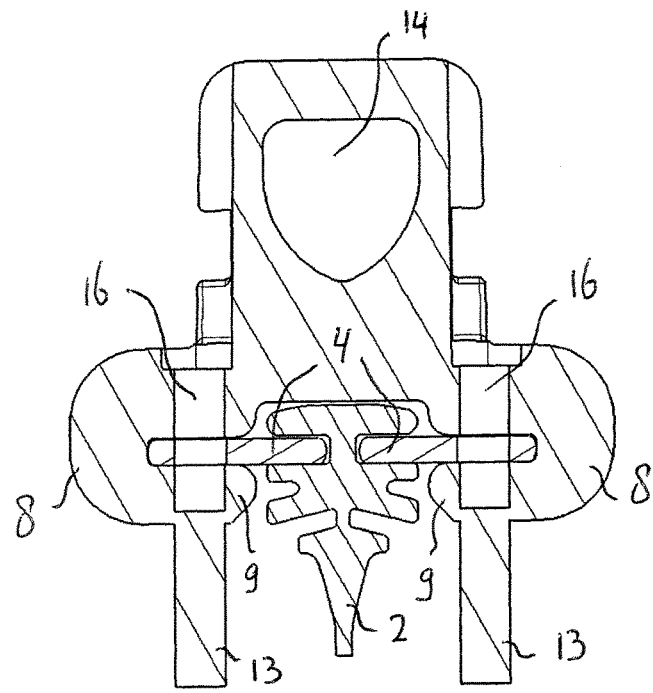
FIGS. 4 and 5 are cross-sectional views of the connecting device of FIGS. 2 and 3, respectively.
Figure 5:
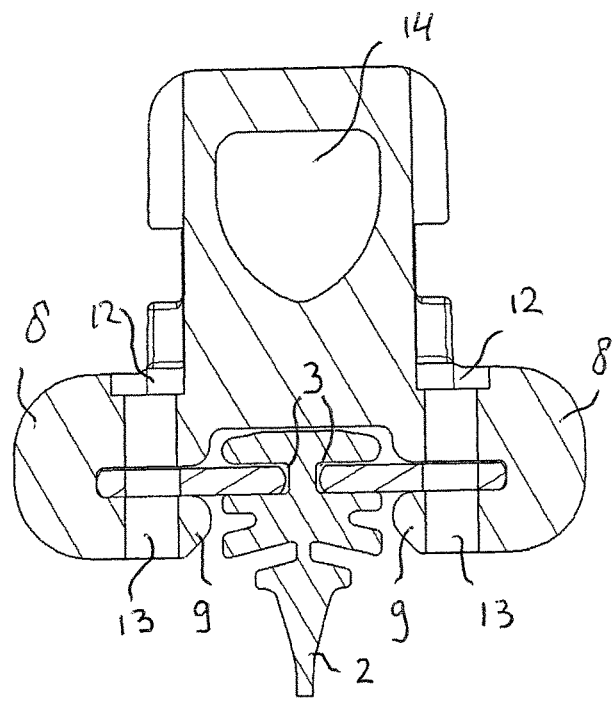

As shown in FIGS. 2, 3, 4 and 5, the pins 13 are movable from a first position (FIGS. 2 and 4), wherein the pins 13 in a pre-mounted position are fixed to the connecting device 5, into a second position (FIGS. 3 and 5), wherein the pins 13 in a mounted position as single constructional elements are interconnecting the connecting device 5 and the longitudinal strips 4. The pins 13 can be pressed manually from the first position into the second position. In the first position shown in FIGS. 2 and 4 the pins 13 and the connecting device 5 are made in one piece. With reference to FIGS. 4 and 5 the connecting device 5 comprises guiding channels 16 for guiding each pin 13 from the first position into the second position. As depicted, each guiding channel 16 extends in a direction perpendicular to the windscreen to be wiped. In the pre-mounted position the pins 13 are fixed to the connecting device 5 near an end of the guiding channel 16 (FIG. 4). In the mounted position the pins 13 extend inside a corresponding guiding channel 16 and through a corresponding hole 15 of a respective longitudinal strip 4.

Figure 8:
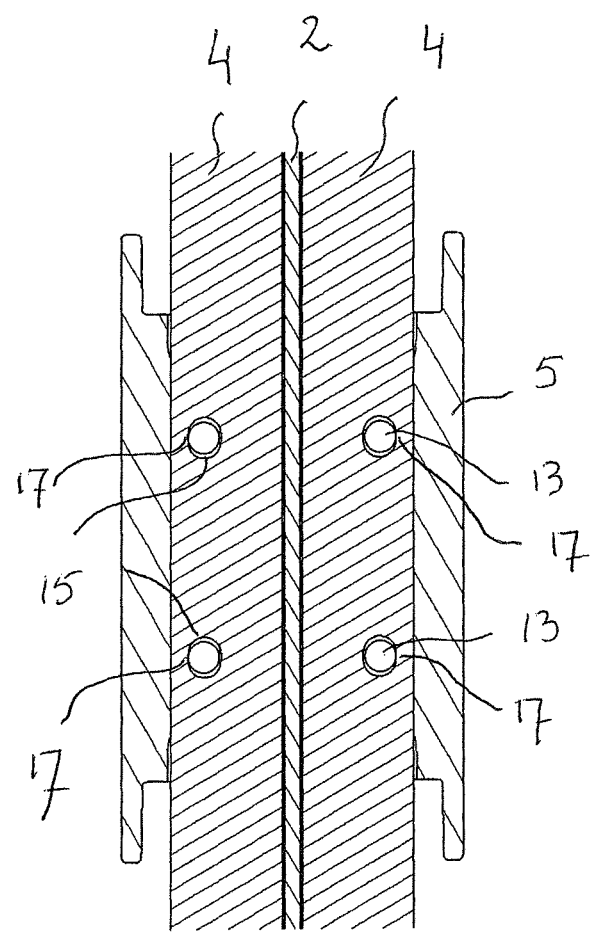
FIG. 8 is a bottom view of the longitudinal strips of FIG. 7 in mounted position.

As shown in FIG. 8, the pins 13 and the holes 15 in the longitudinal strips 4 are slightly misaligned, so as to ensure that a side wall of each pin 13 abuts a wall of a corresponding hole 15 at a location 17 facing towards a corresponding leg 8 of the connecting device 5. Thus, the longitudinal strips 4 are pressed against the legs 8 of the connecting device 5 in order to avoid lateral play of the longitudinal strips 4.

The invention is not restricted to the variants shown in the drawing, but it also extends to other preferred embodiments that fall within the scope of the appended claims.

The invention claimed is:

1. A windscreen wiper device of the flat blade type, comprising an elastic, elongated carrier element, as well as an elongated wiper blade of a flexible material, which can be placed in abutment with a windscreen to be wiped, which wiper blade includes opposing longitudinal grooves on its longitudinal sides, in which grooves spaced-apart longitudinal strips of the carrier element are disposed, which windscreen wiper device comprises a connecting device for an oscillating arm, wherein said connecting device is connected to at least one longitudinal strip by at least one pin cooperating with a corresponding at least one hole provided in said at least one longitudinal strip, wherein said pin is movable from a first position, wherein said pin in a pre-mounted position is fixed to said connecting device, into a second position, wherein said pin in a mounted position as a single constructional element is interconnecting said connecting device and said longitudinal strip; wherein said connecting device comprises a guiding channel for guiding said pin from said first position into said second position; and wherein said connecting device has a substantially U-shaped cross-section, wherein free end of legs of said U-shaped cross-section extend inwardly so as to form grooves for receiving said longitudinal strips, and wherein said free ends are each provided with a corresponding said guiding channel for guiding said pin, two pairs of opposite pins; and wherein said at least one hole comprises two pairs of correspondingly shaped holes in said longitudinal strips; and wherein said pins and said holes are misaligned in order to allow sides of said pins to abut against walls of corresponding holes to avoid lateral movement of said longitudinal strips.

2. The windscreen wiper device according to claim 1, wherein said pin can be pressed from said first position into said second position.

3. The windscreen wiper device according to claim 1, wherein in said first position said pin and said connecting device are made in one piece.

4. The windscreen wiper device according to claim 1, wherein said guiding channel extends in a direction at least substantially perpendicular to the windscreen to be wiped.

5. The windscreen wiper device according to claim 1, wherein said pin in said pre-mounted position is fixed to said connecting device near an end of said guiding channel facing towards the windscreen to be wiped.

6. The windscreen wiper device according to claim 1, wherein said connecting device is connected to the longitudinal strips by said two pairs of opposite pins cooperating with said correspondingly shaped holes in said longitudinal strips and interconnecting said connecting device and said longitudinal strips near outer ends of said connecting device.

7. The windscreen wiper device according to claim 1, wherein said at least one hole has a closed circumference.

* * * * *